Sept. 26, 1950   D. E. MEITZLER   2,523,386
PRESSURE OPERATED FUEL QUANTITY CONTROL
Filed Jan. 30, 1945   3 Sheets-Sheet 3

INVENTOR
Donald E. Meitzler

Patented Sept. 26, 1950

2,523,386

UNITED STATES PATENT OFFICE 2,523,386

PRESSURE OPERATED FUEL QUANTITY CONTROL

Donald E. Meitzler, Manchester, Conn., assignor to United Aircraft Corporation, East Hartford, Conn., a corporation of Delaware Application January 30, 1945, Serial No. 575,342

11 Claims. (Cl. 230—56)

This invention relates to a control for the supply of fuel to the engine cylinders of free-piston units.

The length of the stroke of the piston assembly in the free-piston unit changes as a result of changes in various operating conditions of the unit. Such changes in the stroke length, unless compensated for, may cause stalling of the unit by excessive shortening of the stroke or injury to the unit by excessive lengthening of the stroke. A feature of this invention is a control of the fuel delivered to the engine cylinder as a function of the length of the piston stroke to provide for decreasing the fuel supply as the stroke lengthens or for increasing the fuel supply as the stroke shortens.

One feature of the invention is the adjustment of the fuel supply in response to changes in the outer end position of the piston stroke.

In fuel injection systems in which the quantity of fuel is controlled by a helix on the pump plunger, a mechanism may be provided for turning the plunger. This mechanism may be controlled from a control station remote from the injection pump, thus requiring control connections between the station and the mechanism. A feature of this invention is the control of this mechanism by changes in the pressure on the fuel delivered to the pump. In this way, the control connections may be dispensed with, and the fuel conduit will transmit the pressure changes for actuating the mechanism.

Another feature is the adjustment of the fuel quantity as a function of both the fuel pressure and the length of the piston stroke.

In the copending application of Meitzler, Serial No. 550,896, now Patent No. 2,461,224 dated February 8, 1949, is described an overstroke control in which if the piston stroke exceeds a predetermined limit the quantity of fuel delivered to the injection device is throttled to prevent continued lengthening of the stroke. A feature of this invention is a modification of the control of said application by providing for adjustment of the pump plunger for controlling the quantity of fuel delivered on each stroke of the injection pump. To accomplish this, the injection pump has a helix on the plunger which by angular adjustment of the plunger controls the effective length of the piston stroke.

Other objects and advantages will be apparent from the specification and claims, and from the accompanying drawings which illustrate an embodiment of the invention.

Figure 1:
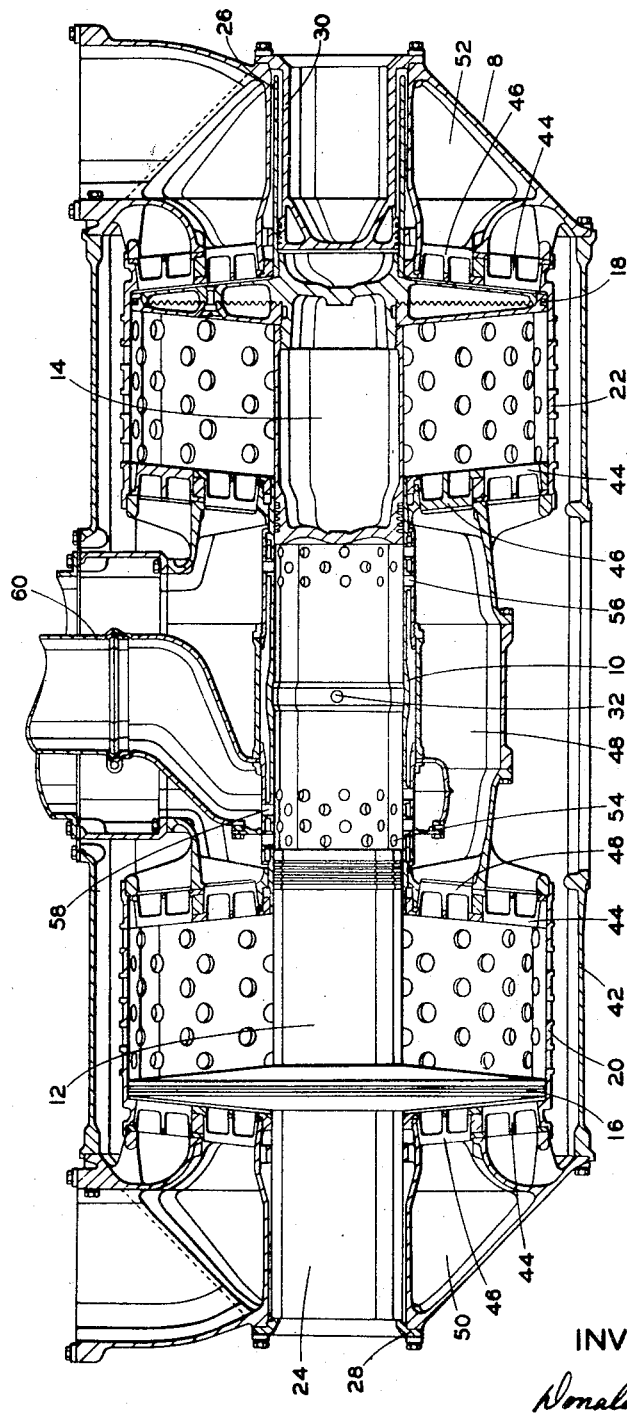
Fig. 1 is a sectional view through the free-piston unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

Figure 2:
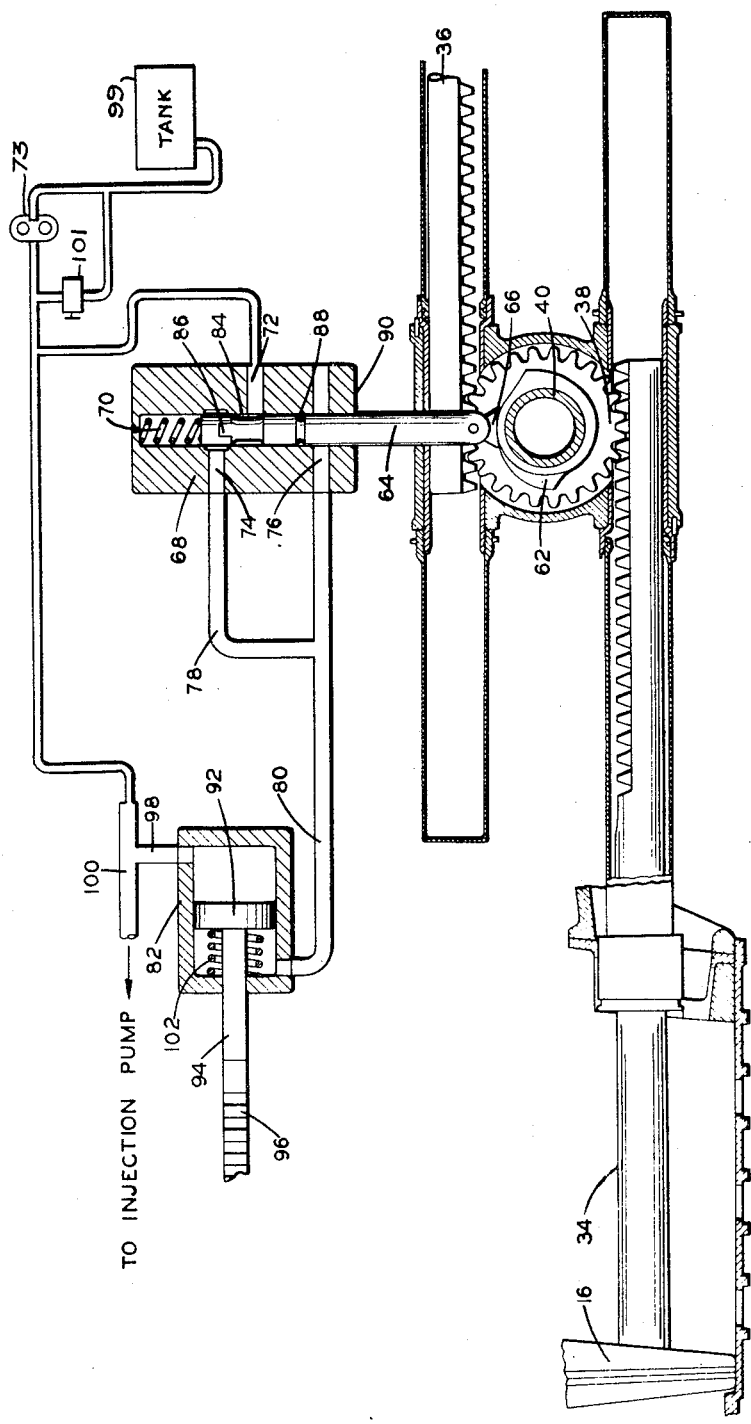
Fig. 2 is a sectional view through the synchronizing linkage and showing the control structure.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage, which may include racks 34 and 36, Fig. 2, extending from the piston assemblies and meshing with a pinion 38 on a shaft 40.

Intake manifold 42, which extends around the compressor and engine cylinders, conducts air to intake valves 44 in the heads of the compressor cylinders through which air alternately enters opposite ends of these cylinders. The compressed air leaves the cylinders through discharge valves 46, also at opposite ends of the compressor cylinders and passes into a central scavenge chamber 48 and end chambers 50 and 52. These chambers may be connected by a scavenge manifold, not shown.

Compressed gas from the chambers enters engine ports 54 and 56 which are uncovered by pistons 12 and 14 at the end of the power stroke, thereby permitting air to be blown through the engine cylinder. Gas in the engine cylinders is discharged through exhaust ports 58 into exhaust manifold 60.

The shaft 40 has a cam 62 which reciprocates a plunger 64 in timed relation to the motion of the piston assemblies. Plunger 64 may have a rocking shoe 66 pivoted to the end for engagement with the cam.

The plunger 64 reciprocates in a casing 68 and is held against the cam by a spring 70. The casing has an inlet port 72 connected to a supply of fluid under pressure such as a pump 73 and spaced outlet ports 74 and 76 are connected by conduits 78 and 80 to one end of a cylinder 82. The plunger 64 has a groove 84 communicating with a longitudinal slot 86. This slot is in a position to provide fluid connection between ports 72 and 74 adjacent the upper end of the plunger stroke and the flow of fluid through the slot is governed by number of strokes and by the length of time during each stroke that the connection between the ports is open. A groove 88 in the plunger is in a position to connect port 76 to a vent port 90 as the pistons approach the inner end of the stroke.

Cylinder 82 has a piston 92 having a projecting piston rod 94 on which is formed a rack 96 used for adjusting the quantity of fuel delivered by the injection pump. The end of cylinder 82 opposite its connection with conduit 80 is connected by a conduit 98 to the fuel conduit 100 between the fuel supply and the injection pump. In this way, the fuel pressure acts on one side of piston 92 in opposition to a spring 102 and also in opposition to the fluid pressure controlled by the plunger 64. This arrangement permits a control of fuel quantity by varying the pressure of the fuel in the supply conduit.

The fuel supply may include the tank 99 from which the pump 73 delivers fuel under pressure past a pressure regulating valve 101 to conduit 100. This type of fuel supply is old as shown in the patent to Edwards No. 2,389,492.

Figure 3:
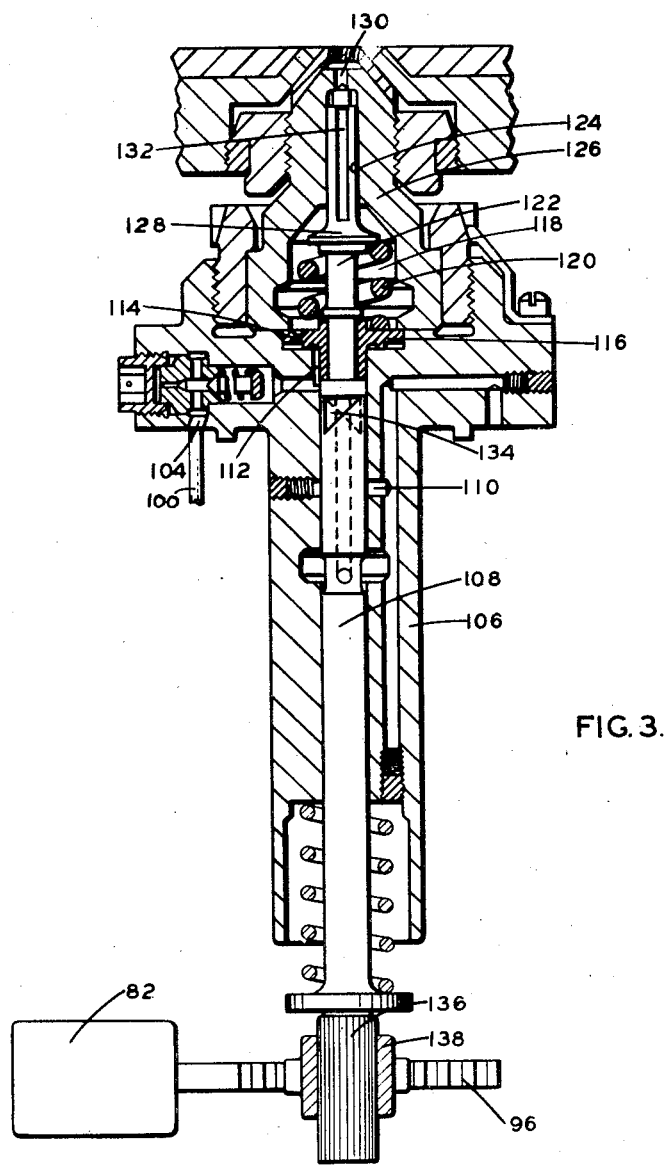
Fig. 3 is a sectional view through the injection device and showing the adjustment of the pump plunger.

The injection pump is described in detail in the copending Meitzler application, Serial Number 573,109, filed January 16, 1945, now abandoned. It is sufficient to note for the purpose of this application, as shown in Fig. 3, that the conduit 100 is connected to a filling port 104 of a casing 106 in which a plunger 108 reciprocates. During its reciprocation the plunger covers a discharge port 110 and on the pumping stroke forces fuel through a groove 112 and passages 114 in a cuff 116 into a chamber 118. A spring 120 normally holds the cuff in the position shown, but clearance is provided so that the cuff 116 may lift in order that fuel may flow into the chamber.

A needle 122 guided at one end by the cuff and in the other end by a bore 124 in the nozzle body 126 has a flange 128 also acted upon by spring 120 for closing the discharge passage 130 through which fuel is injected into the engine cylinder. A groove 132 permits fuel to flow from the chamber to the end of the needle.

The plunger 108 has a helical notch 134 which by turning of the plunger varies the point in the plunger stroke at which the port 110 is covered. The plunger has a spline section 136 fitting within a correspondingly splined pinion 138 engageable with the rack 96. In this way, the angular position of the plunger which controls the fuel quantity is adjusted by the movement of the piston 92 within its cylinder. The pressure of the fuel supply acts upon piston 92 to move it to the right for adjustment of the fuel supply and the pressure from the stroke responsive device which includes the plunger 64 tends to move the piston 92 toward the left, also for changing the quantity of fuel.

It is to be understood that the invention is not limited to the specific embodiment herein illustrated and described, but may be used in other ways without departure from its spirit as defined by the following claims.

I claim:

1. In a free-piston unit, an engine cylinder, a compressor cylinder, a piston assembly in said cylinder, means for injecting fuel into the engine cylinder, means for delivering fuel under pressure to said injecting means, means controlled by the position of the piston assembly in the cylinders for adjusting the quantity of fuel delivered to the engine cylinder, said means including fluid pressure actuated means, and a connection from said fluid pressure actuated means to said fuel delivering means for causing adjustment of the fuel quantity delivered by the injecting means in response to changes in the pressure of fuel supplied to the injecting means.

2. In a free-piston unit, an engine cylinder, opposed compressor cylinders, opposed piston assemblies in said cylinders, means for synchronizing the opposed assemblies, fuel injection means for the engine cylinder, means for supplying fuel under pressure to said injecting means, means for adjusting the quantity of fuel delivered by said injecting means on each stroke, and hydraulically actuated means connected to said adjusting means and responsive to changes in the pressure of fuel delivered to the injecting means for operating said adjusting means.

3. In a free-piston unit, an engine cylinder, opposed compressor cylinders, opposed piston assemblies in said cylinders, means for synchronizing the opposed assemblies, fuel injection means for the engine cylinder, means for supplying fuel under pressure to said injecting means, means for adjusting the quantity of fuel delivered by said injecting means on each stroke including a fuel adjusting rack and hydraulically actuated means for moving said rack, and a connection from said hydraulically actuated means to said fuel supply whereby said rack is adjusted in response to changes in the pressure of the fuel.

4. In a free-piston unit, an engine cylinder, opposed compressor cylinders, opposed piston assemblies in said cylinders, means for synchronizing the opposed assemblies, fuel injection means for the engine cylinder, means for supplying fuel under pressure to said injecting means, means for adjusting the quantity of fuel delivered by said injecting means on each stroke including a fuel adjusting rack, and hydraulically actuated means for moving said rack, and a connection from said hydraulically actuated means to said fuel supply whereby said rack is adjusted in response to changes in the pressure of fuel delivered to the injecting means, and means responsive to changes in the end position of the stroke of the piston assembly for also operating said adjusting means.

5. In a free-piston unit, an engine cylinder, opposed compressor cylinders, opposed piston assemblies in said cylinders, means for synchronizing the opposed assemblies, fuel injection means for the engine cylinder, means for supplying fuel under pressure to said injecting means, means for adjusting the quantity of fuel delivered by said injecting means on each stroke including a fuel adjusting rack, and hydraulically actuated means for moving said rack, and a connection from said hydraulically actuated means to said fuel supply whereby said rack is adjusted in response to changes in the pressure of fuel delivered to the injecting means, and means responsive to changes in the end position of the stroke of the piston assembly for also operating said adjusting means, said pressure responsive means operating in opposition to said stroke responsive means.

6. In a free-piston unit, an engine cylinder, opposed compressor cylinders, opposed piston assemblies in said cylinders, means for synchronizing the opposed assemblies, fuel injection means for the engine cylinder including a pump having a plunger, means for adjusting the fuel quantity including a helix on the plunger, and means for turning said plunger in the pump including a rack and hydraulically actuated means connected to and moving said rack, means for supplying fuel under pressure to said pump, and a connection from said supply means to said hydraulically actuated means for moving the rack for turning the plunger in response to changes in the pressure of the supplied fuel.

7. In a free-piston unit, an engine cylinder, opposed compressor cylinders, opposed piston assemblies in said cylinders, means for synchronizing the opposed assemblies, fuel injection means for the engine cylinder including a pump having a plunger, means for adjusting the fuel quantity including a helix on the plunger, a rack, and a connection between the rack and the plunger for turning the plunger by movement of the rack, a piston for moving the rack, a cylinder for said piston, means for supplying fuel under pressure to the injection pump, and a connection from said supplying means to one side of the piston for actuation of the rack in response to changes in fuel pressure.

8. In a free-piston unit, an engine cylinder, opposed compressor cylinders, piston assemblies in said cylinders, means for synchronizing the assemblies, fuel injection means for the engine cylinder including a helix on the plunger, a rack, and a connection between the rack and the plunger for turning the plunger by movement of the rack, a piston for moving the rack, a cylinder for said piston, means for supplying fuel under pressure to the injection pump, and a connection from said supplying means to one side of the piston, a plunger movable by the piston assembly, and means responsive to movement of said plunger for controlling the admission of fluid to the other side of the piston.

9. In a free-piston unit, an engine cylinder, a compressor cylinder, a piston assembly in said cylinder, means for injecting fuel into the cylinder, means for supplying fuel under pressure to said injecting means, means for varying the pressure of the supplied fuel, and means responsive to changes in the pressure of fuel supplied to the injecting means for adjusting the quantity of fuel delivered to the engine cylinder on each stroke of the piston assembly.

10. In a free-piston unit, an engine cylinder, opposed compressor cylinders, opposed piston assemblies in said cylinders, fuel injection means for the engine cylinder, means for supplying fuel under pressure to said injecting means, means for varying the pressure of the supplied fuel, means including a rack for adjusting the quantity of fuel delivered by said injecting means on each stroke, and means responsive to changes in the pressure of the fuel for adjusting said rack.

11. In a free-piston unit, an engine cylinder, opposed compressor cylinders, opposed piston assemblies in said cylinders, fuel injection means for the engine cylinder including a pump having a plunger, means for adjusting the fuel quantity including a helix on the plunger, and means for turning said plunger in the pump, means for supplying fuel under pressure to said pump, means for adjusting the pressure of the supplied fuel, and means responsive to changes in said pressure for turning the plunger.

DONALD E. MEITZLER.

REFERENCES CITED

The following references are of record in the file of this patent:

UNITED STATES PATENTS

| Number | Name | Date |
| --- | --- | --- |
| 1,704,325 | Junkers | Mar. 5, 1929 |
| 1,845,600 | Herr | Feb. 16, 1932 |
| 2,016,613 | Pescara | Oct. 8, 1935 |
| 2,084,823 | Pescara | June 22, 1937 |
| 2,102,121 | Janicke | Dec. 14, 1937 |
| 2,132,083 | Pescara | Oct. 4, 1938 |
| 2,168,829 | Pescara | Aug. 8, 1939 |
| 2,178,311 | Pescara | Oct. 31, 1939 |
| 2,200,892 | Pescara | May 14, 1940 |
| 2,344,058 | Pescara | Mar. 14, 1944 |
| 2,389,492 | Edwards | Nov. 20, 1945 |
| 2,409,218 | Lewis | Oct. 15, 1946 |
| 2,461,224 | Meitzler | Feb. 8, 1949 |